US005890641A

United States Patent [19]

Pfautz

[11] Patent Number: 5,890,641

[45] Date of Patent: Apr. 6, 1999

[54] WIRE MOVEMENT AND FAULT DETECTOR

[75] Inventor: Douglas Sebastian Pfautz, Landisville, Pa.

[73] Assignee: The Whitaker Corporation, Wilmington, Del.

[21] Appl. No.: 936,484

[22] Filed: Sep. 18, 1997

[51] Int. Cl.[6] .......................... B65H 43/00; B23Q 15/00; B21B 33/02

[52] U.S. Cl. .................................... 226/11; 72/4; 226/45; 226/1

[58] Field of Search ................................ 226/11, 24, 45, 226/100; 72/4, 5

[56] References Cited

U.S. PATENT DOCUMENTS

| | | | |
|---|---|---|---|
| 2,685,626 | 8/1954 | Zwack | 226/11 X |
| 2,896,944 | 7/1959 | Shiba | 226/11 |
| 3,264,740 | 8/1966 | Veale | 226/11 X |
| 5,029,619 | 7/1991 | Hongo et al. | 226/45 X |
| 5,112,004 | 5/1992 | Tipton | 226/45 X |
| 5,348,208 | 9/1994 | Tamura | 226/24 |
| 5,761,938 | 6/1998 | College | 226/11 X |

*Primary Examiner*—Michael Mansen
*Attorney, Agent, or Firm*—Mary K. VanAtten; Anton P. Ness

[57] ABSTRACT

A detector unit (30) for use in a wire handling machine (10) includes an encoder (38) for monitoring movement of the wire (26) along a wire feed path (28) and for detecting the presence of a splice (130) and the end of the wire (26) as it is being fed. The shaft (58) of the encoder is electrically interconnected to the frame (12) of the machine by means of a brush (66) and leaf spring (68) and includes an enlarged diameter (62) for engaging and being driven by the wire being fed. A presser member (84), which is electrically isolated from the frame (12), is arranged to urge the wire against the enlarged diameter (62) so that when a the wire is fed it causes the shaft (58) of the encoder to rotate proportionately. When the controller unit (126) detects wire movement that is substantially different from that expected, the machine is stopped and an appropriate message is displayed. When a splice (130) is present the presser member (84) is momentarily electrically interconnected to the frame (12) through the splice and the enlarged diameter (62). Similarly, when the end of the wire (26) being fed reaches and passes through the detector unit (30) the presser member (84) electrically engages a stop surface (94) thereby electrically interconnecting the presser member (84) to the frame (12). When this grounding of the presser member (84) is detected by the controller unit (126) the machine is stopped and an appropriate message is displayed.

13 Claims, 4 Drawing Sheets

WIRE MOVEMENT AND FAULT DETECTOR

The present invention-relates to an electrical wire handling apparatus having the capability to precisely monitor movement of the wire and to detect wire run out and wire splices, and more particularly to such apparatus having a single unit that performs this monitoring and detection functions.

BACKGROUND OF THE INVENTION

Machines that utilize wires in the manufacture of products typically draw the wire from a so called endless supply, such as a barrel or a reel. An example of a machine that utilizes wire in its manufacturing operation is one that produces wire leads for use in various electrical products or equipment. Such a machine, called a "lead maker" in the industry, feeds wire from an endless source, measuring its length precisely, then cutting it to a desired length. The ends may or may not be terminated to electrical terminals, or the ends may simply be prepared for termination. Such machines require some mechanism for monitoring the actual feeding movement of the wire and comparing it to the movement that is expected so that the machine can be stopped if a significant difference is detected. Further, some mechanism must be provided for detecting a splice in the wire being drawn from the endless source and for detecting the end of the wire upon wire run out. This latter function is usually performed by a mechanism separate from the mechanism that is monitoring feeding movement. This, of course, tends to make the machine more complex and costly to manufacture.

What is needed is an economical single unit mechanism that both will monitor movement of the wire and will detect wire run out and wire splices.

SUMMARY OF THE INVENTION

An apparatus is disclosed for handling electrical wire. The apparatus includes a feed unit for moving the electrical wire along a wire feed path for performing a manufacturing operation with respect thereto. A detector unit is provided for precisely monitoring movement of the wire along the wire feed path and for detecting wire run out and wire splices. The detector unit includes a base and an encoder attached to the base. The encoder includes an encoder shaft extending therefrom having an electrically conductive peripheral surface fixed to the shaft so that it is adjacent the wire feed path. The roller is electrically coupled to the base by means of an electrical coupling. An electrically conductive presser member is coupled to but electrically isolated from the base and is arranged to urge an electrical wire against the roller so that when the wire is moved along the feed path the encoder shaft is caused to rotate in proportion to the movement of the wire. The apparatus includes detector means for detecting electrical continuity between the presser member and the roller.

DESCRIPTION OF THE PREFERRED EMBODIMENT

Figure 1:
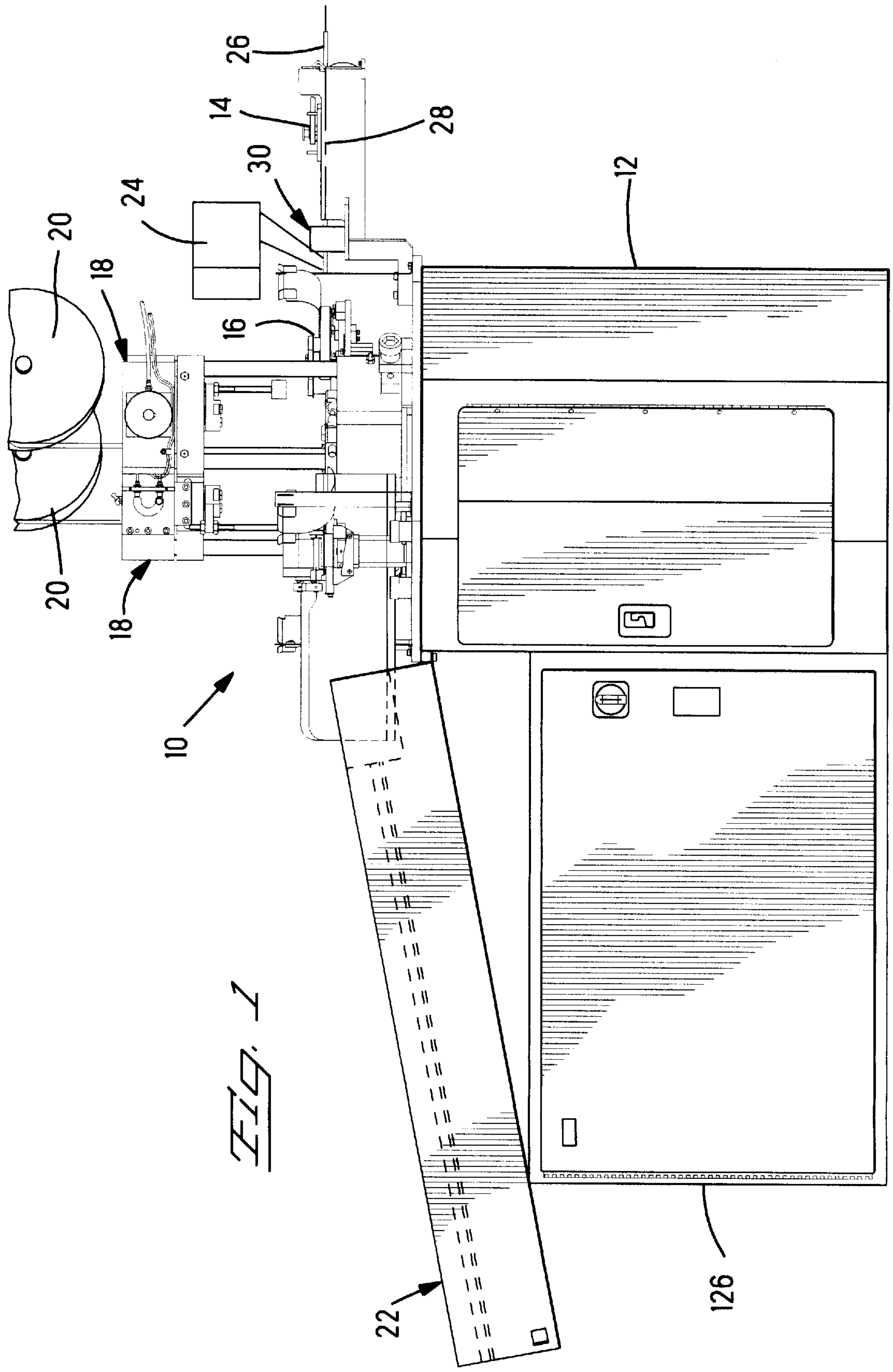
FIG. 1 is a front view of a lead making machine incorporating the teachings of the present invention.
Figure 4:
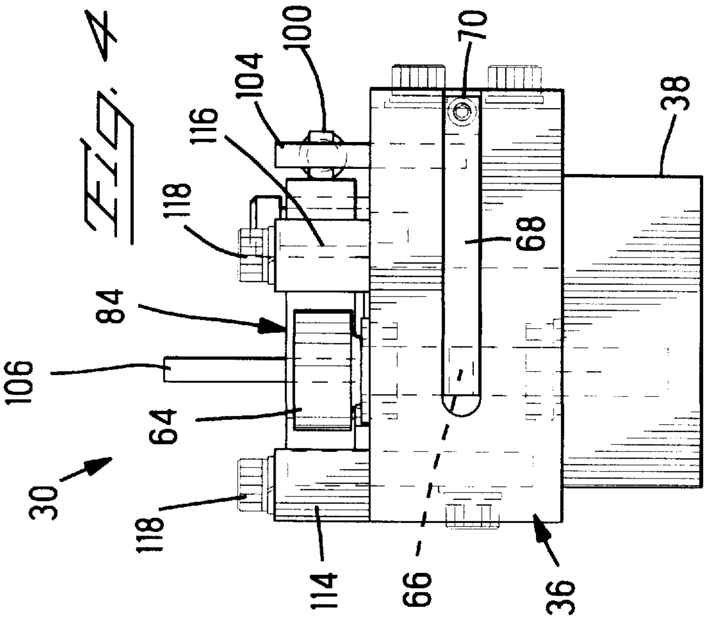
FIG. 4 is a front view of the detector unit shown in FIG. 1.
Figure 3:
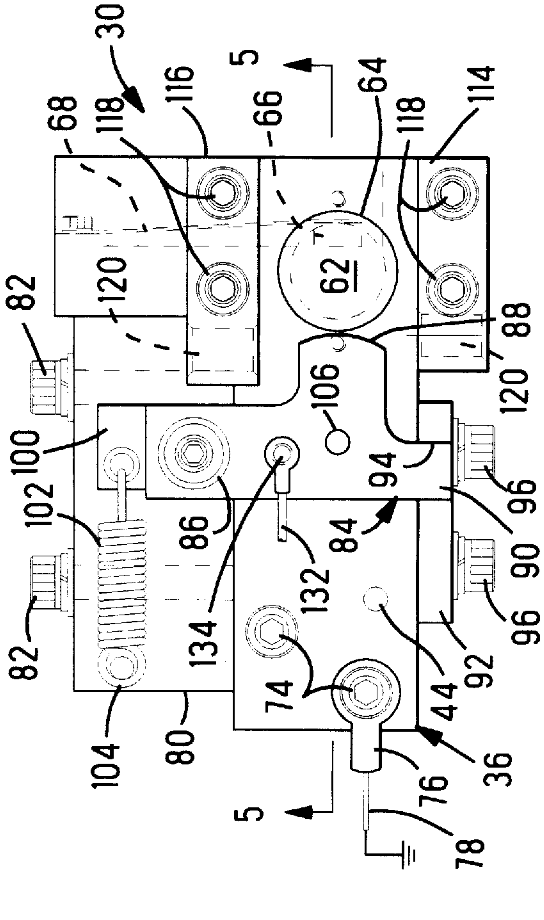
FIG. 3 is a top view of the detector unit shown in FIG. 1.
Figure 2:
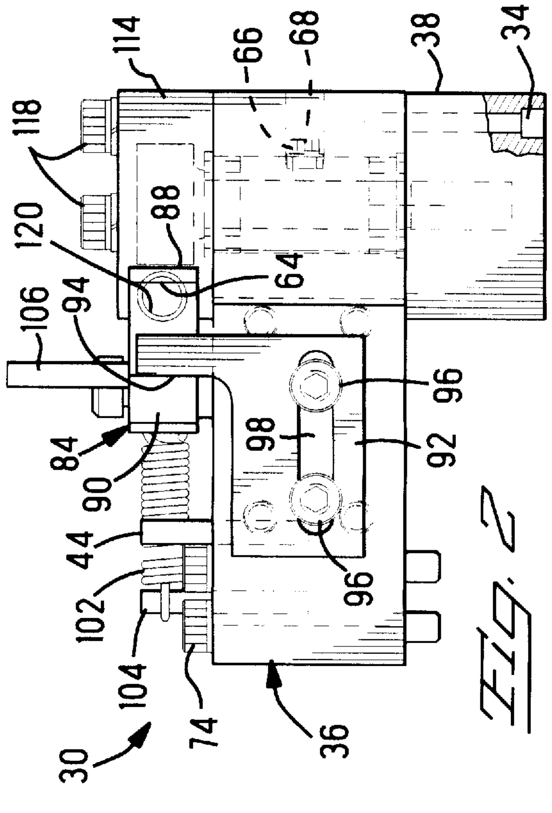
FIG. 2 is a side view of the detector unit shown in FIG. 1.
Figure 5:
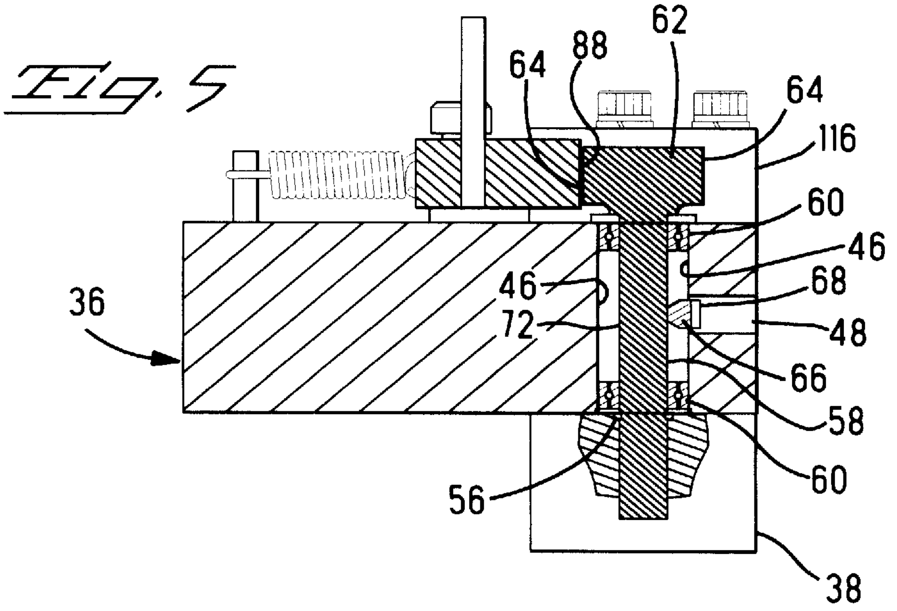
FIG. 5 is a cross-sectional view taken along the lines 5—5 in FIG. 3.
Figure 6:
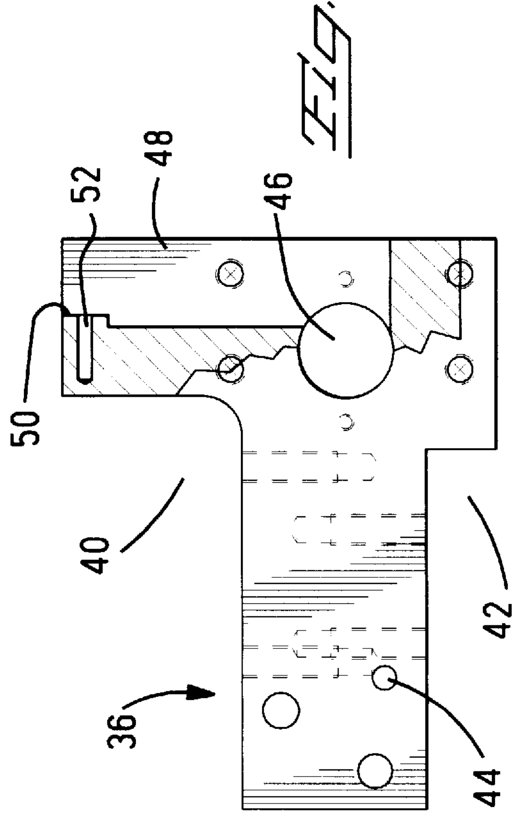
FIG. 6 is a side view of the base of the detector unit shown in FIG. 2.
Figure 7:
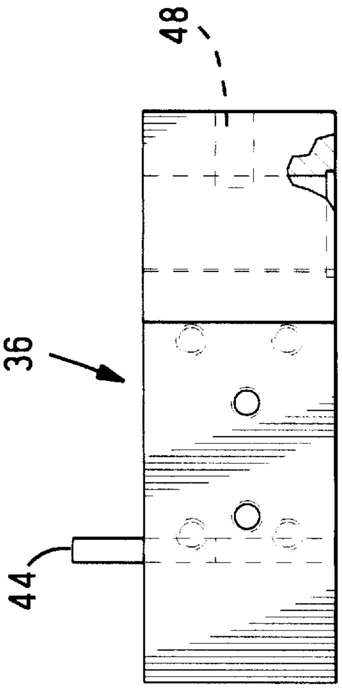
FIG. 7 is a top view of the base of the detector unit shown in FIG. 2.

There is shown in FIG. 1 a typical lead making machine 10 incorporating the teachings of the present invention. It will be understood that this machine is illustrative only and that the teachings of the present invention may be advantageously utilized with respect to other machines that utilize wire or cable in the manufacture of a product. The machine 10 includes a frame 12, a wire straightening unit 14, a wire feed assembly 16, two terminating units 18 including reels 20 containing carrier strips with attached terminals, a stacking tray 22, and an operator control console 24. The machine 10, as described above, is manufactured and distributed by AMP Incorporated under the trademark "ADUZI". As shown in FIG. 1, a wire 26 extends through the wire straightening unit 14 and into the wire feed assembly 16 and is fed along a wire feed path 28 to the terminating units 18. A detector unit 30 is attached to the frame 12 between the wire feed assembly 16 and the wire straightening unit 14 for precisely monitoring movement of the wire along the wire feed path 28 and for detecting wire run out and wire splices. The detector unit 30 includes a base 36 and an encoder 38 attached to the base by means of screws 34 that extend into threaded holes in the base. The base 36, as shown in FIG.2 includes first and second cutouts 40 and 42, respectively, formed in opposite sides thereof. A pin 44 is pressed into a hole in the base so that it extends outwardly, as shown in FIG. 7, for a purpose that will be explained. As best seen in FIG. 6, a bore 46 is formed through the base and a slot 48 is formed in the end of the base 36 so that it intersects the bore at approximately the mid point of the thickness of the base. A step 50 is formed in the bottom surface of the slot 48 and includes a threaded hole 52. As best seen in FIG. 5, an encoder shaft 58 is journaled in ball bearings 60 that are arranged within the bore 46. The encoder shaft 58 extends through the base 36 and into the encoder 38 where it is coupled to the encoder armature, or code wheel, in the usual manner. The other end of the encoder shaft includes an enlarged diameter 62 having a knurled outer peripheral surface 64. The ball bearings 60 include outer race flanges, one of which is in a counterbore in the bottom of the base 36 and the other is resting on the top surface of the base. A retaining ring 56 is disposed within a groove in the shaft 58 thereby retaining the shaft and the two ball bearings 60 within the bore 46. The encoder shaft 58 is free to rotate within the ball bearings 60 within the limits of the encoder armature. A brush 66 is attached to the end of a leaf spring 68 by any suitable means, such as brazing, and is arranged within the slot 48, as best seen in FIG. 4 and 5. The end of the leaf spring 68 opposite the brush 66 is secured to the step 50 by means of a screw 70 that is threaded into the hole 52. The thickness of the brush 66 and the configuration of the leaf spring 68 are arranged so that the brush is urged into electrical contact with the surface 72 of the encoder shaft 58, as shown in FIG. 5. This effectively electrically interconnects the encoder shaft 58 to the base 36, both of which are made from an electrically conductive material such as metal. The base 36 is secured to the frame 12 by means of screws 74 which extend through holes in the base and into threaded holes in the frame, not shown. One of the screws 74 extends through a terminal 76 having a ground lead attached thereto, as best seen in FIG. 3. The other end of the ground lead is electrically attached to the frame 12 by any suitable means, thereby electrically interconnecting the encoder shaft 58 to the machine frame 12.

An insulating block 80, as best seen in FIG. 3, made of an electrically insulating material such as Ultra High Molecular Weight Polyethylene, is rigidly secured to the base 36 within the first cutout 40 by means of screws 82 which extend through clearance holes in the insulating block and into threaded holes in the base 36. A presser member 84, which is made from an electrically conductive material, is pivotally attached to the insulating block 80 by means of a shoulder screw 86 that extends through a loose slip fit hole in the presser member and into a threaded hole in the insulating block 80. The presser member is electrically isolated from the base 36. A wire engaging surface 88 is formed on an end of the presser member 84 opposing the surface 64 of the enlarged diameter of the encoder shaft 58. A tang 90 projects from an end of the presser member 84 and extends over the side of the base 36, as best seen in FIG. 3. A stop member 92 includes a stop surface 94 that is aligned to engage the tang 90 and limit pivotal movement of the presser member toward the peripheral surface 64 to prevent inadvertent contact that may damage the peripheral surface. The stop member 92 is attached to the base 36 by means of screws 96 that extend through a clearance elongated hole 98 formed in the stop member and into threaded holes in the base so that the stop member is in electrical engagement with the base. A tab 100 projects from an end of the presser member 36 opposite the tang 90, as best seen in FIG. 3, where one end of an extension spring 102 is attached, the other end of the spring being attached to a pin 104 that extends from the insulating block 80. The spring 102 urges the presser member 36 to pivot counterclockwise, as viewed in FIG. 3, so that the wire engaging surface 88 is urged toward the peripheral surface 64. The stop member 92 is positioned so that the tang 90 is urged into engagement with the stop surface 94 by the spring 102, leaving a small amount of clearance between the wire engaging surface 88 and the peripheral surface 64 of the encoder shaft 58. In this position the presser member 84 is in electrical engagement with the base 36 through the tang 90 and the stop surface 94, for a purpose that will be explained. A pin 106 extends upwardly from the presser member 84, as shown in FIGS. 2 and 3, and is manually moved toward the left to pivot the presser member against the urging of the spring 102 when threading the wire 26 through the detector unit, as will be explained. Movement of the presser member in this direction is limited by the presser member engaging the pin 44. Left and right wire guides 114 and 116, respectively, are attached to the base 36 on opposite sides of the enlarged diameter 62 by means of screws 118 that extend through holes in the wire guides and into threaded holes in the base. Each wire guide includes a wire guide opening 120 formed therethrough in approximate alignment with the side of the peripheral surface 64 that faces the wire engaging surface 88, so that when a wire 26 extends through both openings 120 it also engages the peripheral surface 64.

Figure 9:
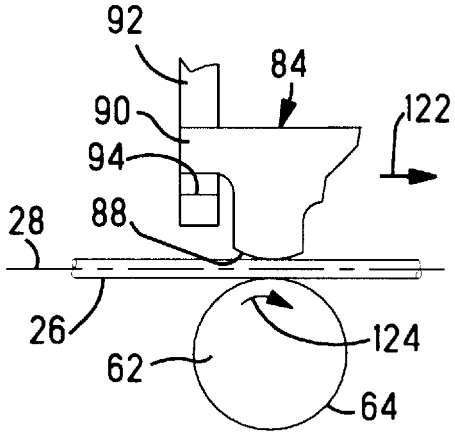
FIG. 9 is a schematic representation of normal operating function of the detector unit.

In operation, the wire 26 is threaded through the wire straightening unit 14, through one of the wire guide openings 120, between the enlarged diameter 62 and the presser member 84, which is momentarily pivoted clockwise by manually pushing the pin 106 toward the left, as viewed in FIG. 3, and then through the other wire guide opening 120. The pin 106 is then released so that the presser member 84 will pivot counterclockwise under the urging of the spring 102, the wire engaging surface 88 holding the wire 26 firmly against the peripheral surface 64 of the encoder shaft 58 as best seen in FIG. 9. The wire is then threaded through the wire feed unit 16 in the usual manner. During operation of the machine 10, as the wire 26 is fed along the wire feed path 28 in the direction of the arrow 122, as shown in FIG. 9, the wire is held firmly against the peripheral surface 64 so that the enlarged diameter 62 of the encoder shaft 58 rotates in the direction of the arrow 124 in precise proportion to the amount of movement of the wire. This rotation of the encoder shaft in turn rotates the armature of the encoder 38 which outputs an,electrical signal that corresponds to the amount of wire movement. This signal is routed to a controller unit 126 that is adjacent the frame 12, as shown in FIG. 1, which controls the operation of the machine 10. If the amount of detected wire movement does not correspond to the amount that is expected by the controller unit the machine is stopped and an appropriate message is displayed on the console 24.

Figure 10:
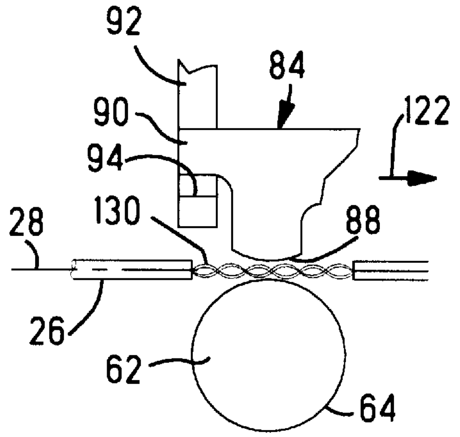
FIG. 10 is a schematic representation of splice detecting operating function of the detector unit.
Figure 11:
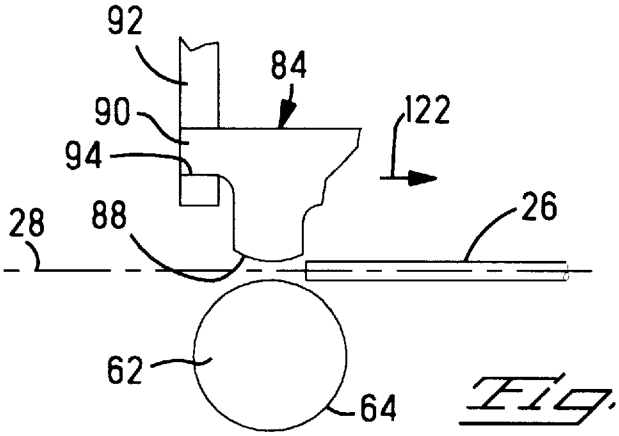
FIG. 11 is a schematic representation of end detecting operation function of the detector unit.
Figure 8:
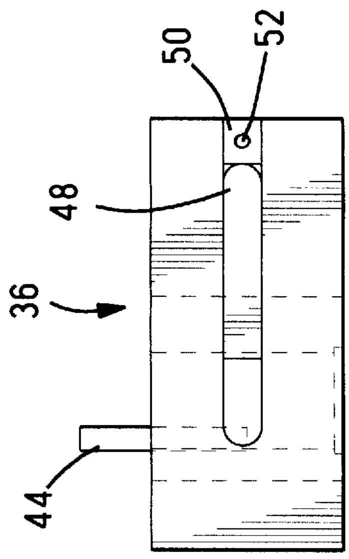
FIG. 8 is a front view of the base of the detector unit shown in FIG. 2.

Occasionally, a splice 130 will be present in the wire 26. The splice is simply the two ends of bare conductors tightly wrapped together to form a single continuous length of wire. Typically, several of these splices will be present in a single large barrel of wire, and must be detected and removed by the machine 10 so that the splice is not in the final product or, does not jam or damage the machine. During feeding of the wire 26 along the feed path, when the splice 130 enters between the enlarged diameter 62 and the presser member 84, as best seen in FIG. 10, the bare wire momentarily electrically connects the peripheral surface 64 of the encoder shaft 58 to the wire engaging surface 88 of the presser member 84. Since the encoder shaft 58 is electrically interconnected to the machine frame 12 via the brush 66, leaf spring 68, and the base 36, the presser member 84 is also electrically interconnected to the frame. A terminated end of a wire lead 132 is electrically connected to the presser member 84 by means of a screw 134 that extends through the terminal and into a threaded hole in the presser member, as shown in FIG. 3. The wire lead is interconnected to the controller unit 126 in the usual manner so that the controller can detect the electrical connecting of the presser member 84 to the frame 12. Similarly, when the end of the wire 26 reaches the detector unit 30 during feeding along the feed path 28, as best seen in FIG. 11, the wire exits from between the enlarged diameter 62 and the presser member 84 allowing the presser member to be pivoted counterclockwise by the spring 102 until the tang 90 engages the stop surface 94. This electrically interconnects the wire lead 132 to the frame 12 through the stop member 92 and the base 36. The controller is programmed to interpret the electrical interconnection of the wire lead 132 to the frame 12 as indicative of either the presence of a splice or the end of the wire. In either case the controller will stop the machine 10 and display an appropriate message to the operator on the console 24.

An important advantage of the present invention is that a single detector unit is capable of precisely monitoring movement of the wire along the wire feed path and to detect both the presence of a wire splice and the end of the wire. This results in economies when manufacturing the single detector unit as well as reduced complexity in the mounting and integrating of the detector unit into the machine.

I claim:

1. In an apparatus for handling electrical wire, including a feed unit for moving said electrical wire along a wire feed path for performing a manufacturing operation with respect to said electrical wire, a detector unit for monitoring movement of said wire along said wire feed path and for detecting wire run out and wire splices comprising:

(1) a base;

(2) an encoder attached to said base, said encoder including an encoder shaft extending therefrom having an electrically conductive peripheral surface on an enlarged diameter fixed thereto adjacent said wire feed path, wherein said peripheral surface is electrically coupled to said base by means of an electrical coupling; and (3) an electrically conductive presser member coupled to but electrically isolated from said base, arranged to urge an electrical wire against said peripheral surface so that when said wire is moved along said feed path said encoder shaft is caused to rotate in proportion to said movement of said wire, said apparatus including controller means for detecting electrical continuity between said presser member and said peripheral surface.

2. The apparatus according to claim 1 wherein said electrical coupling comprises a brush in electrical engagement with one of said encoder shaft and said peripheral surface.

3. The apparatus according to claim 2 including a first resilient member urging said brush in said electrical engagement and wherein said brush is electrically attached to said base.

4. The apparatus according to claim 3 wherein said first resilient member is a metal spring having one end attached to said base and another end attached to said brush.

5. The apparatus according to claim 4 wherein said brush is in said electrical engagement with said encoder shaft.

6. The apparatus according to claim 1 wherein said presser member is arranged to undergo movement from a side of said wire feed path opposite said peripheral surface toward said peripheral surface under the urging of a second resilient member.

7. The apparatus according to claim 6 wherein said presser member is pivotally attached to said base at a first pivot and said movement toward said peripheral surface is pivotal movement about said first pivot.

8. The apparatus according to claim 7 wherein said base includes an electrically conductive portion and an electrically insulated portion, said presser member being pivotally attached to said insulated portion and said encoder being attached to said electrically conductive portion.

9. The apparatus according to claim 8 wherein said encoder shaft is journaled for rotation in said electrically conductive portion of said base, including an opening in said electrically conductive portion extending to said encoder shaft, a brush in electrical engagement with said encoder shaft and a first resilient member in said opening arranged to urge said brush into electrical engagement with said encoder shaft.

10. The apparatus according to claim 9 wherein said first resilient member is a metal spring having one end attached to said electrically conductive portion of said base and another end attached to said brush.

11. The apparatus according to claim 10 wherein said peripheral surface and said encoder shaft are in mutual electrically conductive contact.

12. The apparatus according to claim 6 including an adjustable stop member attached to said base and arranged to selectively limit said movement of said presser member toward said peripheral surface.

13. The apparatus according to claim 12 wherein said adjustable stop member is positioned so that when a said wire is not between said peripheral surface and said presser member a portion of said presser member electrically engages said stop member.

* * * * *